United States Patent

Rosenberg

Patent Number: 5,960,827
Date of Patent: Oct. 5, 1999

[54] WATER METERING DEVICE PARTICULARLY USEFUL FOR MULTIPLE OUTLET UNITS

[76] Inventor: Peretz Rosenberg, Moshav Beit Shearim, 30046 D.N., Haamakim, Israel

[21] Appl. No.: 08/942,676

[22] Filed: Oct. 2, 1997

[30] Foreign Application Priority Data

Oct. 4, 1996 [IL] Israel .......................................... 119352

[51] Int. Cl.⁶ .................................................. F16L 55/18
[52] U.S. Cl. .......................................... 137/561 A; 47/79
[58] Field of Search .............................. 137/561 A; 47/79

[56] References Cited

U.S. PATENT DOCUMENTS

| | | | |
|---|---|---|---|
| 3,864,938 | 2/1975 | Hayes, Jr. ........................... | 137/561 A |
| 3,936,262 | 2/1976 | Hehl ..................................... | 137/561 A |
| 4,016,033 | 4/1977 | Schiel et al. ......................... | 137/561 A |
| 4,140,178 | 2/1979 | Ohlswager et al. ................. | 137/561 A |
| 4,185,414 | 1/1980 | Miller . | |
| 5,125,431 | 6/1992 | Vogel et al. ......................... | 137/561 A |
| 5,311,904 | 5/1994 | Beppu .................................. | 137/561 A |

FOREIGN PATENT DOCUMENTS 8402828  8/1984  WIPO .

*Primary Examiner*—A. Michael Chambers
*Attorney, Agent, or Firm*—Benjamin J. Barish

[57] ABSTRACT

A water metering device includes a housing defining a chamber having an inlet, connectable to a source of pressurized water, and at least one outlet; and a stem in the chamber having an inner end fixed to the housing wall, and an outer end spaced from the outlet for receiving one end of a feed tube to be sealingly passed through the outlet; the stem being formed with a metering passageway for conducting water entering the housing via the inlet opening into and through the feed tube, when received thereon, to a location externally of the housing.

18 Claims, 3 Drawing Sheets

WATER METERING DEVICE PARTICULARLY USEFUL FOR MULTIPLE OUTLET UNITS

FIELD AND BACKGROUND OF THE INVENTION

The present invention relates to water metering devices such as are used for irrigating plants. The invention is particularly useful in water metering devices having multiple outlets for supplying water to a plurality of plants, and is therefore described below with respect to this application.

Water metering devices are known having a common inlet and a plurality of outlets each receiving a feed tube for feeding water to the location to be irrigated. In general, the flow rate through each feed tube is preselected or controlled at the outlet end of the respective tube. Such a construction therefore necessitates a separate flow control or flow regulator for each feed tube, which significantly increases the overall cost of the device. In addition, in order to clean the device of clogging particles, it is generally necessary to detach each feed tube from the device and flush the feed tubes and the device separately. Further, in many watering metering devices of this type the feed tube may accidentally pop-out by the water pressure, or may be accidentally pulled out during handling or use.

OBJECT AND BRIEF DESCRIPTION OF THE INVENTION

An object of the present invention is to provide a water metering device having advantages in one or more of the above respects.

According to a broad aspect of the present invention, there is provided water metering device comprising: a housing having first and second walls defining a chamber between them, an inlet opening in the first wall connectable to a source of pressurized water for inletting water into the chamber, and at least one outlet opening in the second wall; and a stem in the chamber having an inner end fixed to the first housing wall, and an outer end spaced from the outlet opening in the second housing wall for receiving one end of a feed tube to be sealingly passed through the outlet opening in the second housing wall; the stem being formed with a passageway for conducting water entering the housing via the inlet opening into and through the feed tube, when received thereon, to a location externally of the housing. The housing includes a first part integrally formed with the first housing wall having the inlet opening therethrough, and with the stem fixed to the first housing wall; and a second part, removably attached to the first part and formed with the second housing wall having the at least one outlet opening therethrough.

According to further features in the preferred embodiment of the invention described below, the passageway is a metering passageway and includes includes an axially-extending recess on the outer face of the stem. This recess is covered by the one end of the feed tube when received on the stem, which end is deformable by the pressure within the chamber such that the flow of water through the axially-extending recess is automatically regulated to compensate for variations in the inlet pressure.

According to still further features in the described preferred embodiment, the outer end of the stem is aligned with the outlet opening in the second housing wall, and the outlet opening is tapered to have a diameter increasing in the outward direction, to facilitate insertion of the feed tube through the outlet opening into the outer end of the stem. Preferably, the outer end of the stem is dimensioned and located with respect to the outlet opening such that the feed tube, when inserted through the outlet opening and received on the outer end of the stem, is clamped between the stem and the second housing wall defining the outlet opening.

According to further features in the described preferred embodiment, the housing includes a plurality of outlet openings, and the first housing wall includes a plurality of the stems each aligned with one of the outlet openings, and each adapted to receive one end of a feed tube to be sealedly passed through the aligned outlet opening.

As will be described more particularly below, a water metering device constructed according to the above features is particularly useful when incorporated in a multiple outlet unit, and provides a number of important advantages over the devices heretofore used. Thus, the metering passageway formed in each stem defines the flow rate for the respective feed tube, thereby enabling different flow rates to be provided by forming the plurality of stems with different metering passageways. In addition, some or all of the metering passageways could be in the form of axialy-extending recesses on the outer face of the stem, which recesses are covered by the end of the respective feed tube when received on the stem, such that the flow rate of the water through each feed tube is automatically regulated by the deformation of the end of the feed tube with respect to the metering recesses to compensate for variations in the inlet pressure. Further, such an arrangement permits reverse-flushing the feed tubes and the metering device without the need to detach the feed tubes from the metering device. Moreover, the described arrangement not only facilitates the application of the feed tubes to the metering device, but also clamps the feed tubes such as to preclude pop-out by the water pressure within the feed tube or accidental pull-out during handling or use.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
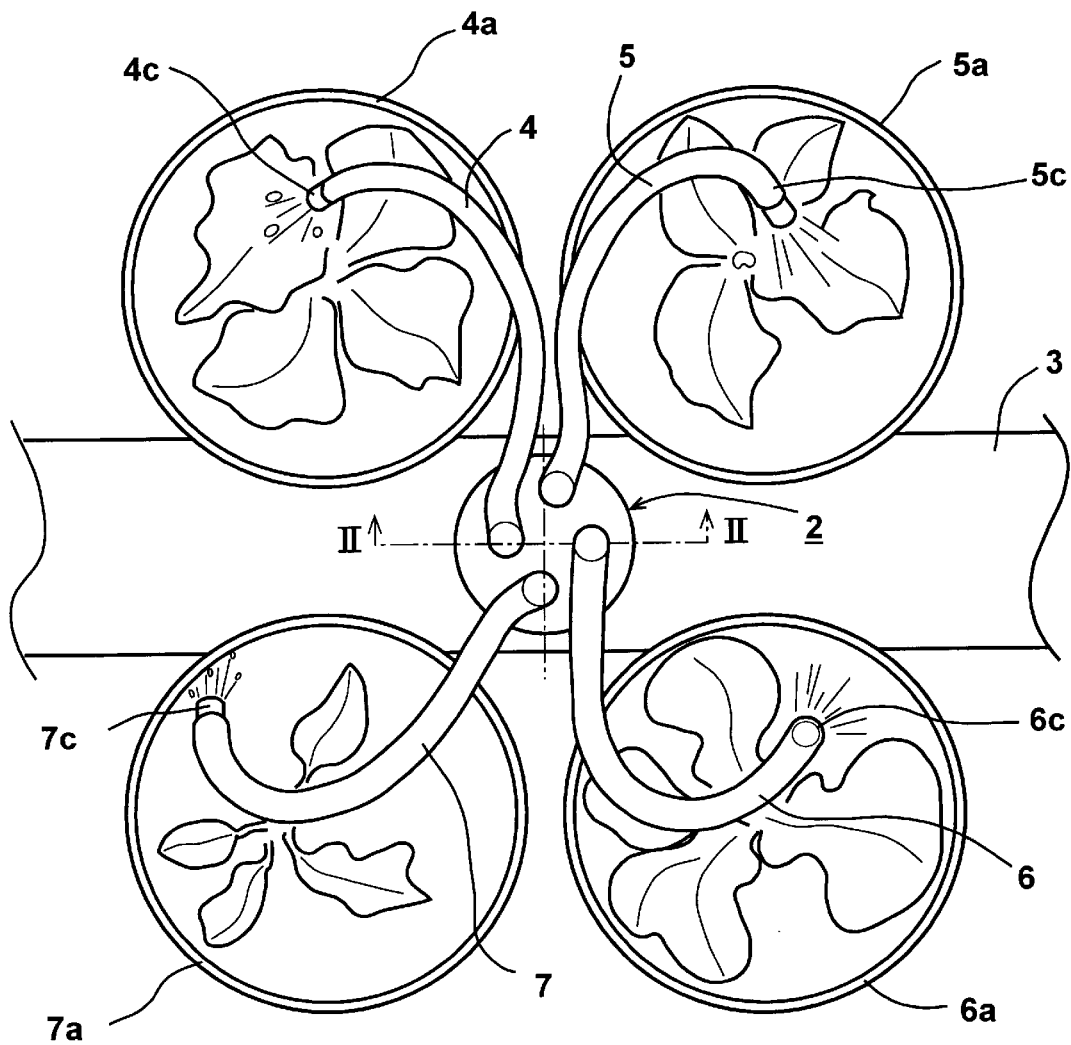
FIG. 1 is a plan view illustrating one form of water metering device constructed in accordance with the present invention.

The watering metering device illustrated in the drawings, therein generally designated 2, is attachable to a water supply tube 3 supplying pressurized water to the device. The device includes a plurality of outlet feed tubes 4–7 each supplying water to a plant 4a–7a. The watering metering devices is connected to the water supply tube 3 by means of a tap 8 (FIG. 2) including a barb-type connector 9 inserted through an opening in the water supply pipe.

Figure 2:
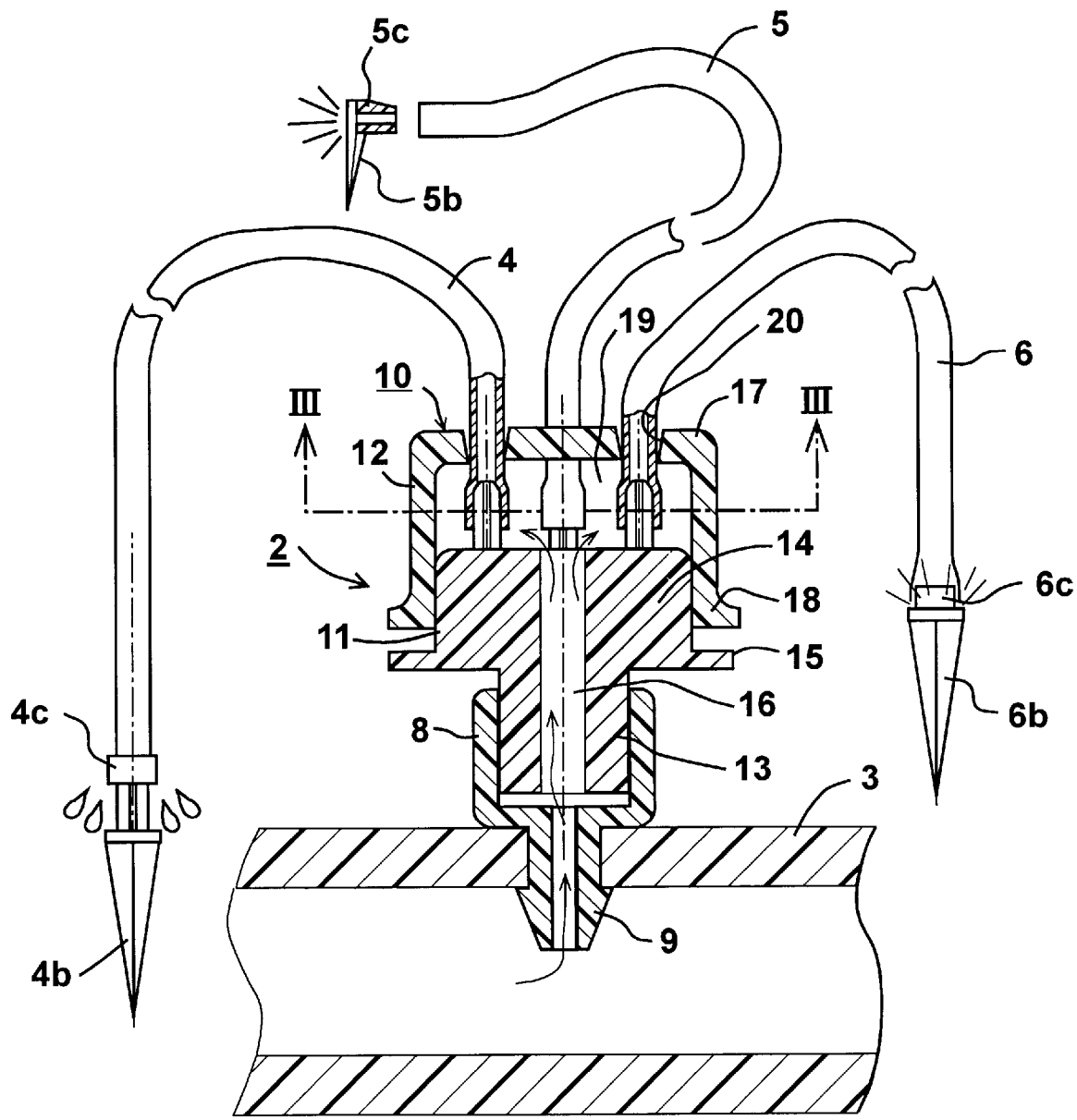
FIG. 2 is an enlarged longitudinal sectional view along line II—II of FIG. 1.

Each feed tube 4–7 carries, at its outer end, a stake, e.g., 4b–6b for insertion into the ground to be supplied with the water, and an irrigation device 4c–7c for supplying water to the respective location. The irrigation devices 4c–7c may be of any type, according to the particular application. For purposes of example, FIG. 2 illustrates irrigation device 4c as a dripper, and irrigation devices 5c and 6c as sprinklers.

The water metering device 2 includes a housing, generally designated 10, constituted of two parts 11, 12, removably attached to each other, as by a friction fit.

Housing part 11 is integrally formed with a cylindrical section 13 at one end, a second cylindrical section 14 at the opposite end of larger diameter than cylindrical section 13, and an annular flange 15 between the two cylindrical sections 13 and 14. A bore 16 passes axially through the center of the two cylindircal sections 13, 14, and the annular flange 15 between them.

Housing part 12 is cup-shaped, open at one end and closed at the opposite end by an end wall 17. The open end part 12 is formed with an annular flange 18 slightly spaced from flange 15 of part 11.

The two housing parts 11 and 12 are dimensioned such that cylindrical section 14 of housing part 11 is received with a friction fit into housing part 12 and defines with it an internal chamber 19, as shown in FIG. 2. Housing part 11 is also dimensioned with respect to tap 8 such that cylindircal section 13 of housing part 11 defines a pin frictionally received within the socket of tap 8. When the parts are assembled as shown in FIG. 2, it will be seen that bore 16 through pin 13, flange 15 and cylindrical section 14, defines an inlet passageway leading from tap 8 of the water supply tube 3 into chamber 19.

Figure 4:
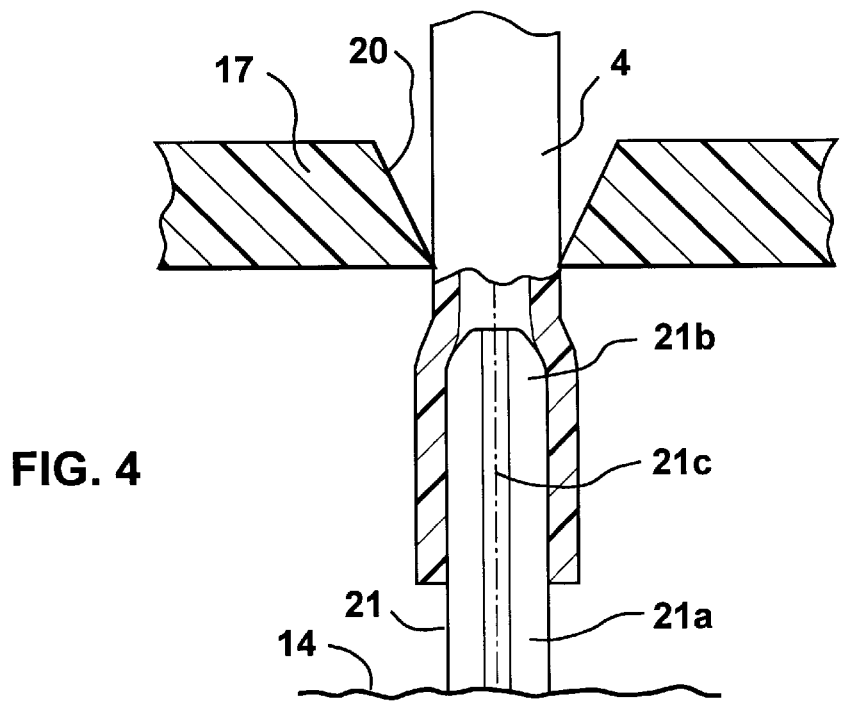
FIG. 4 is an enlarged fragmentary view illustrating a preferred manner of clamping a feed tube to prevent accidental pull-out.

End wall 17 of housing part 12 is further formed with a plurality of outlet openings 20, one for each of the four feed tubes 4–7. Each outlet opening 20 is of a tapered configuration, increasing in diameter in the outward direction, (FIG. 4) for a purpose to be described below.

Section 14 of housing part 11 serves as a wall defining chamber 19 with wall 17. This section is integrally formed with a plurality of stems 21–24, one for each of the feed tubes 4–7, and aligned with the respective outlet opening 20 in wall 17. Each stem is fixed at its inner end to section 14 of housing part 11, as shown at 21a, FIG. 4, and has an outer end 21b which is rounded and spaced slightly under the respective outlet opening 20. In additon, each stem 21–24 has at least one axially-extending recess as shown at 21c in FIG. 4. The outer ends of these axially-extending recesses are covered by the inner ends of the respective feed tubes 4–7 when received on their stems, such that the flow of the water through the axially-extending recesses to the respective feed tube is automatically regulated, as will be described more particularly below, to compensate for variations in the inlet pressure.

Figure 3:
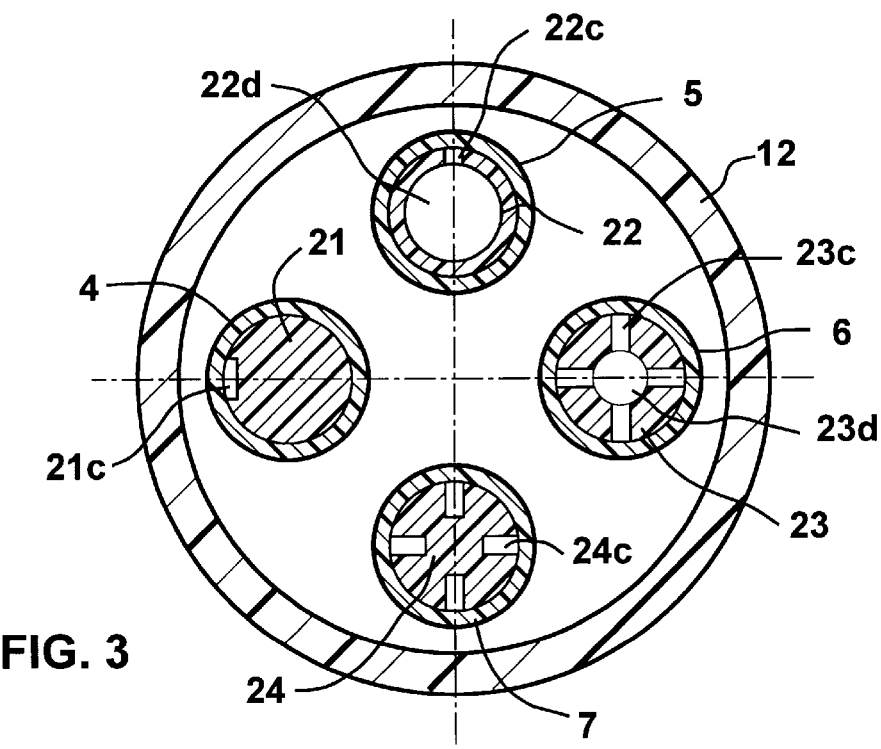
FIG. 3 is a transverse sectional view along line III—III of FIG. 2.

The rate of flow of the water through each of the four feed tubes 4–7 is determined by the axial passageways formed in the stems 21–24 for the respective feed tube. FIG. 3 illustrates stem 21 as including a single axial recess 21c (FIG. 4), so that the flow rate to its respective feed tube 4 will be the lowest. Stem 22 is formed with a similar axial recess 22c, but is also formed with an axial bore 22d, so that the feed rate to its feed tube 5 will be higher. Stem 23 is formed with four axial recesses 23c communicating with an axial bore 23d, so that the feed rate to its feed tube 6 will be even higher. Stem 24 is formed with four axial recesses 24c but without an axial bore, so that the feed rate to its feed tube 7 will be less than that to feed tube 6.

The inner ends of the feed tubes 4–7 may be easily applied through their respective outlet openings 20 onto their respective stems 21–24. This is facilitated by the tapered configuration of the outlet openings 20, the alignment of the stems with their respective outlet openings, and the rounded configuration of the tips of the stems. In addition, each stem 21–24 is dimensioned and located with respect to their outlet openings 20 such that the feed tube, when inserted through the outlet opening and received on the outer end of the stem, is firmly clamped between the stem and the outlet opening, as shown particularly in FIG. 4.

The water metering device illustrated in the drawings may be used as follows:

The four feed tubes 4–7, each connected at one end to an irrigation device 4c–7c to be supplied with water, are connected at their opposite ends to the appropriate stems 21–24 corresponding to the rate of water to be supplied to the respective irrigation device. For example, irrigation devices (such as drippers) to be supplied with the lowest rate would be connected to a stem, such as stem 21, formed with a single axially-extending recess 21c; whereas other types of irrigation devices (such as sprinklers) to be supplied at higher rates, would be connected to a stem, such as stem 23, formed with a plurality of axially-extending recesses 23c and/or an axial bore 23d.

Each feed tube 4–7 is applied to its respective stem 21–24 by merely inserting the inner end of the feed tube through the respective outlet opening 20 onto the outer tip of the respective stem, with the end of the feed tube spaced from the outer surface of section 14 of housing part 11 formed with the stems 21–24, as shown in FIG. 2. As described above, the tapered configuration of the outlet openings 20 facilitates the insertion of each feed tube onto its respective stem 21–24. In addition, each stem is dimensioned and located with respect to its respective outlet opening such that the feed tube, when inserted through the outlet opening and received on the outer end of the stem, is firmly clamped between the stem and the outlet opening, as shown particularly in FIG. 4.

Housing 10, with the four feed tubes 4–7 applied to the stems 21–24 within the housing chamber 19, may then be applied to tap 8 of the water supply tube 3 by inserting pin 13 of the housing into the socket of the tap, as shown in FIG. 2.

When the water metering device is applied to the water supply tube 3, the pressurized water passes from the interior of the tube through bore 16 into chamber 19, and via that chamber through the water passageways in the four stems 21–24 to the respective feed tubes 4–7 applied to those stems. Each feed tube will thus receive water at a flow rate according to the cross-sectional area of the metering passageways formed in the respective stems. Thus, the metering passageway in stem 21 consists of the single axial recess 21c whose outer end is covered by the inner end of the respective feed tube 4, so that this stem will supply water at the lowest feed rate. In addition, since the outer face of the end of feed tube 4 covering the axial recess 21c is exposed to the water pressure within the chamber 19, which pressure is substantially the same as the inlet pressure within supply tube 3, the wall at the end of the feed tube will be displaced within the axially-extending recess 21c more or less according to the pressure within chamber 19, thereby providing a degree of automatic regulation of the flow through the axial recess 21c to compensate for variations in the inlet pressure.

It will be appreciated that the flow rate through the metering passageways of the other stems 22–24 will be similarly regulated, in response to variations in the inlet pressure, by the deformation of their respective feed tubes 5–7 with respect to the axially-extending recesses in those stems.

The water metering device illustrated in the drawings thus permits the flow rate to be controlled through each of the feed tubes 4–7 according to the construction of the stem to which the respective feed tube is attached, thereby obviating the need for flow control devices at the outer ends of the respective feed tubes. Such an arrangement also permits each feed tube, and also the water metering device, to be easily cleaned of clogging particles by back flushing the feed tubes. In addition, the described arrangement facilitates the quick attachment of each feed tube to its respective stem, and also effectively clamps the feed tube so as to prevent its detachment, e.g. by the pressure of the water or by accidental pull-out during handling or use. If a feed tube is to be detached from the water metering device, this can be easily done by inserting a prying element between the two flanges 15 and 18 and prying them appart to separate housing part 11 from housing part 12.

While the invention has been described with respect to one preferred embodiemnt, it will be appreciated that this is set forth merely for purposes of example, and that the invention could be used in other applications. For example the invention could be used not only for multiple outlet units as illustrated, but also for single outlet units when a single feed tube is attached to the metering device.

Many of the variations, modifications and applications of the invention will be apparent.

I claim:

1. A water metering device, comprising:
    a housing having first and second walls defining a chamber between them, an inlet opening in said first wall connectable to a source of pressurized water for inletting water into said chamber, and at least one outlet opening in said second wall;
    and a stem in said chamber having an inner end fixed to said first housing wall, and an outer end spaced from said outlet opening in said second housing wall for receiving one end of a feed tube to be sealingly passed through said outlet opening in said second housing wall;
    said stem being formed with a passageway for conducting water entering the housing via said inlet opening into and through the feed tube, when received thereon, to a location externally of the housing;
    said housing including: a first part integrally formed with said first housing wall having said inlet opening therethrough, and with said stem fixed to said first housing wall; and a second part, removably attached to said first part and formed with said second housing wall having said at least one outlet opening therethrough.

2. The device according to claim 1, wherein said passageway is a metering passageway and includes an axially-extending recess on the outer face of the stem, said recess being partially covered by one end of the feed tube when received on the stem which end is deformable by the pressure within said chamber such that the flow of water through said axially-extending recess is automatically regulated to compensate for variations in the inlet pressure.

3. The device according to claim 1, wherein said outer end of the stem is aligned with said outlet opening in the second housing wall, and said outlet opening is tapered to have a diameter increasing in the outward direction, to facilitate insertion of the feed tube through said outlet opening into the outer end of the stem.

4. The device according to claim 3, wherein the outer end of the stem is dimensioned and located with respect to said outlet opening such that the feed tube, when inserted through the outlet opening and received on the outer end of the stem, is clamped between the stem and said second housing wall defining said outlet opening.

5. The device according to claim 1, wherein both of said housing parts include annular flanges located with respect to each other to facilitate detaching the two parts from each other by prying apart the two flanges.

6. The device according to claim 1, wherein said first housing part is integrally formed with a pin having said inlet opening therethrough, which pin is adapted to be received in a socket of a connector connectable to the source of pressurized water.

7. The device according to 1, wherein said second housing wall includes a plurality of outlet openings, and said first housing wall includes a plurality of said stems each aligned with one of said outlet openings, and each adapted to receive one end of a feed tube to be sealedly passed through the aligned outlet opening.

8. The device according to claim 7, wherein said plurality of stems have metering passageways of different cross-sectional areas to enable preselection of the flow rate for each feed tube when received on its respective stem.

9. The device according to claim 7, further including a feed tube for, and applied to, each of said stems and pasing through the respective outlet opening aligned with the respective stem.

10. A water metering device, comprising:
    a housing having first and second walls defining a chamber between them, an inlet opening in said first wall connectable to a source of pressurized water for inletting water into said chamber, and at least one outlet opening in said second wall;
    a stem in said chamber having an inner end fixed to said first housing wall, and an outer end spaced from said outlet opening in said second housing wall, and an axially-extending recess on its outer face; and a feed tube sealingly passed through said outlet opening in said second housing wall and partially covering said axially-extending recess to define therewith a metering passageway for conducting water entering the housing via said inlet opening to a location externally of the housing.

11. The device according to claim 10, wherein said axially-extending recess on the outer face of the stem is partially covered by one end of the feed tube received on the stem which end of the feed tube is deformable by the pressure within said chamber such that the flow of water through said axially-extending recess is automatically regulated to compensate for variations in the inlet pressure.

12. The device according to claim 10, wherein said outer end of the stem is aligned with said outlet opening in the second housing wall, and said outlet opening is tapered to have a diameter increasing in the outward direction, to facilitate insertion of the feed tube through said outlet opening into the outer end of the stem.

13. The device according to claim 12, wherein the outer end of the stem is dimensioned and located with respect to said outlet opening such that the feed tube, when inserted through the outlet opening and received on the outer end of the stem, is clamped between the stem and said second housing wall defining said outlet opening.

14. The device according to claim 10, wherein said housing includes:
    a first part integrally formed with said first housing wall having said inlet opening therethrough, and with said stem fixed to said first housing wall;
    and a second part, removably attached to said first part and formed with said second housing wall having said at least one outlet opening therethrough.

15. The device according to claim 14, wherein both of said housing parts include annular flanges located with respect to each other to facilitate detaching the two parts from each other by prying apart the two flanges.

16. The device according to claim 14, wherein said first housing part is integrally formed with a pin having said inlet opening therethrough, which pin is adapted to be received in a socket of a connector connectable to the source of pressurized water.

17. The device according to 10, wherein said second housing wall includes a plurality of outlet openings, and said first housing wall includes a plurality of said stems each aligned with one of said outlet openings, and each adapted to receive one end of a feed tube to be sealedly passed through the aligned outlet opening.

18. The device according to claim 17, wherein said plurality of stems have metering passageways of different cross-sectional areas to enable preselection of the flow rate for each feed tube when received on its respective stem.

* * * * *